United States Patent [19]

George

[11] Patent Number: 4,635,502

[45] Date of Patent: Jan. 13, 1987

[54] RACHET SYSTEM FOR HAND-HELD TOOL

[75] Inventor: William A. George, Raleigh, N.C.

[73] Assignee: Black & Decker Inc., Newark, Del.

[21] Appl. No.: 706,272

[22] Filed: Feb. 27, 1985

[51] Int. Cl.[4] .............................................. F16H 1/28

[52] U.S. Cl. .................................... 74/625; 192/43.1; 81/57.22; 74/626; 74/526; 7/165

[58] Field of Search ................. 192/43.1; 74/625, 626, 74/526; 81/54, 57.22; 7/165

[56] References Cited

U.S. PATENT DOCUMENTS

| | | | |
|---|---|---|---|
| 2,138,331 | 11/1938 | Ward | 192/43.1 |
| 2,893,278 | 7/1959 | Rice | 81/52.4 |
| 3,802,518 | 4/1974 | Albert | 173/29 |
| 4,078,589 | 3/1978 | Miller | 144/32 R |
| 4,158,970 | 6/1979 | Laughon | 74/526 |
| 4,347,767 | 9/1982 | Gentiluomo | 192/43.1 |
| 4,358,230 | 11/1982 | Rohlin | 408/124 |
| 4,371,201 | 2/1983 | Stock et al. | 192/43.1 |
| 4,419,911 | 12/1983 | Claudy | 192/43.1 |
| 4,448,098 | 5/1984 | Totsu | 81/467 |

FOREIGN PATENT DOCUMENTS

| | | | |
|---|---|---|---|
| 0118215 | 9/1984 | European Pat. Off. . | |
| 0835543 | 2/1952 | Fed. Rep. of Germany | 192/43.1 |
| 3325534 | 1/1984 | Fed. Rep. of Germany | 81/57.22 |

*Primary Examiner*—Rodney H. Bonck
*Assistant Examiner*—Martin G. Belisario
*Attorney, Agent, or Firm*—Finnegan, Henderson, Farabow, Garrett & Dunner

[57] ABSTRACT

A ratchet system includes a "T" shaped stop-engaging member mounted in a plane perpendicular to a rotating spindle and parallel to a circular carrier member having stop members mounted on the periphrey and rotating with the spindle. The stem of the "T" member is rotatable mounted in a housing surrounding the spindle and upon selective rotation, the ends of the "T" member cross-bar engage the stop members to prevent rotation in a selected direction. The "T" cross-bar transmits the engagement force directly to a recess in the inner wall of the housing. A hand-actuated knob assembly located outside the housing is connected to the "T" member stem by a resilient bushing which provides a restoring force to return the "T" member to a stop engagement position following defection by stop members traveling in a direction counter to that intended to be prohibited.

23 Claims, 4 Drawing Figures

RACHET SYSTEM FOR HAND-HELD TOOL

BACKGROUND OF THE INVENTION

1. Field of the Invention:

The present invention relates to ratchet systems for tools having a spindle rotating in a housing, and particularly to handheld, battery-operated tools having a relatively low torque capacity.

2. Description of the Prior Art:

Electric powered hand-held rotating tools such as electric powered drills and screw drivers are known, as are ratchet systems which can be used to selectively "lock" the spindle to the housing to prevent rotation in one or the other direction about the spindle axis. Applications where such a ratchet system would be desireable include work requiring torque greater than the capacity of the tool motor. In such instances, the spindle can be locked and the torque supplied by hand-turning the housing to drive the spindle and complete the tightening of a screw, unfreezing a stuck drill bit, etc.

Conventional ratchet systems tend to be relatively complex, calling for numerous moving parts which can increase the cost of construction and decreases the reliability of the overall tool. Such complexity is highly undesireable in certain low cost, mass produced consumer items such as light weight, battery-operated drills specifically designed for low-torque use.

Thus, it is a purpose of the present invention to provide a simple but highly reliable ratchet system to enable a rotating spindle to be selectively locked to the spindle housing to prevent spindle rotation in one or the other direction about the spindle axis.

SUMMARY OF THE INVENTION

In accordance with the present invention, as embodied and, broadly described herein, the ratchet system for a hand-held tool having a housing and a spindle mounted to rotate within the housing about an axis comprises a disk-shaped carrier member fixed to the spindle for rotation therewith and having stop means positioned on the carrier periphery, and a "T" shaped stop engaging member mounted in the housing in a plane substantially perpendicular to the spindle axis and spaced from the carrier member along the spindle axis. The stop engaging member is selectively rotatable about the stem portion of the "T" to cause the cross-bar portion of the "T" to rotate out of the plane and into engagement with the stop means on the carrier whenever rotation of the spindle is to be limited.

Preferably, the "T" member stem portion is rotatably mounted in the housing and is actuated by hand-actuating means located outside the housing. The hand-actuating means includes indexing means keyed to the housing with a resilient member connecting the indexing means to the shaft portion.

It is also preferred that the ratchet system further include stop means assocaited with the housing wherein, following rotation of the "T" member stem portion to allow the cross-bar portion to engage the stop means, the "T" member cross-bar portion transmits substantially all of the force of engagement from the carrier stop means to the housing stop means.

Further in accordance with the present invention, as embodied and broadly described herein, the hand-held tool comprises a housing adapted for being hand-held; a spindle rotatably mounted in the housing; means for rotating said spindle in a given direction; and ratchet means for selectively interengaging the housing and the spindle for preventing a substantial degree of relative rotation therebetween in a direction opposite to the given rotational direction, while allowing substantially unrestricted relative rotation in the given direction. Specifically, the ratchet means includes a carrier member fixedly connected to the spindle for rotation therewith and including stop means located on the periphery carrier member. The ratchet means also includes a stop engaging member having a shaft portion and an arm portion rigidly connected to and extending at an angle to the shaft portion, the shaft portion being mounted for rotation in the housing along an axis which is substantially perpendicular to the axis of rotation of the spindle. The arm portion is located within the housing, and the shaft portion extends through the housing to the outside thereof. The shaft portion is selectively rotatable between a non-engagement angular position where the stop means can by-pass the arm portion during rotation of the spindle and carrier member, and an engagement angular position where the stop means can engage the arm portion and thereby prevent further spindle rotation in the opposite direction.

It is still further preferred that the spindle rotating means of the hand-held tool incorporating the ratchet system of the present invention include gear means mounted on a gear carrier fixed to the spindle, and wherein the stop means are positioned on the gear carrier.

The accompanying drawings which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
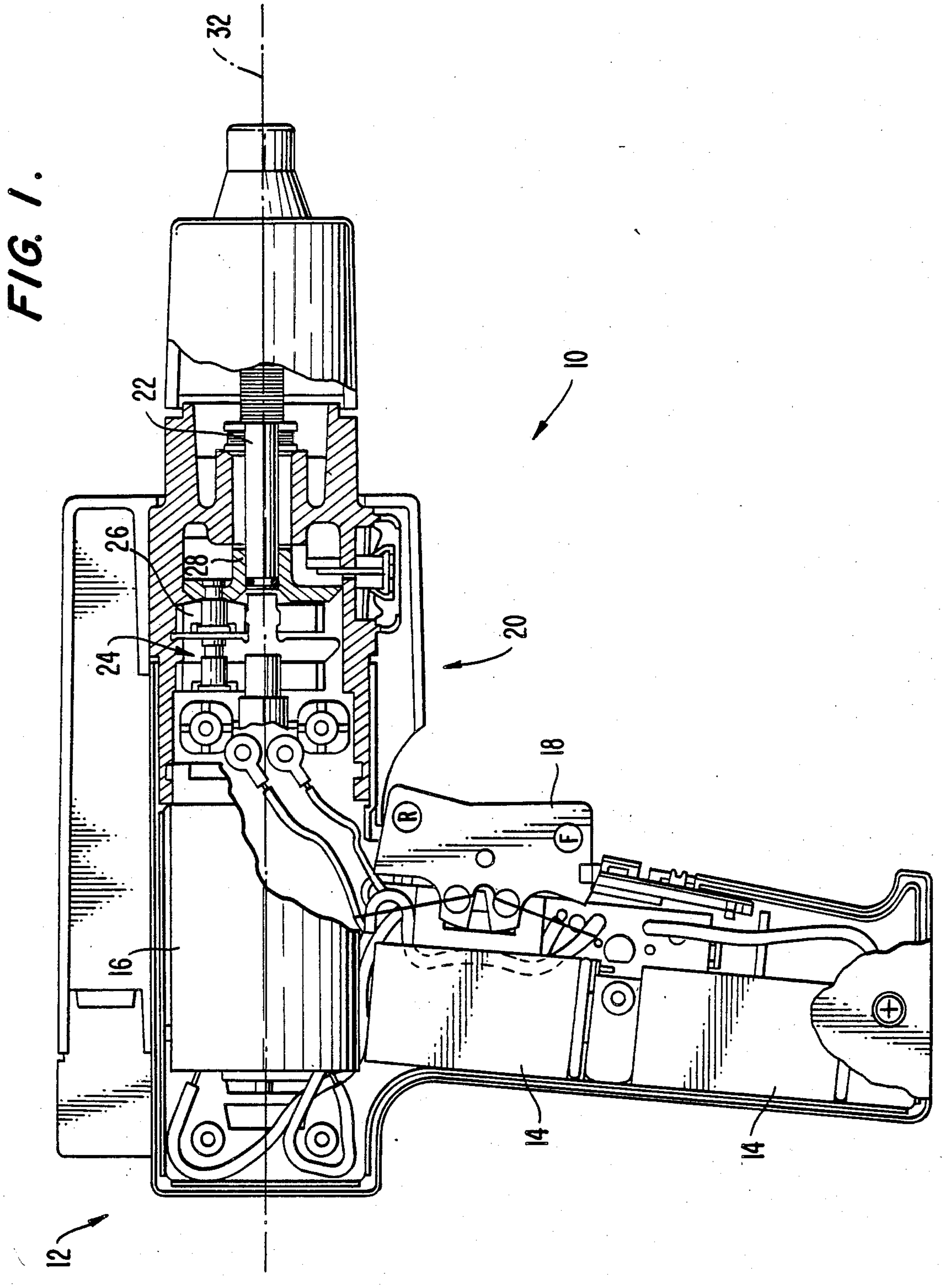
FIG. 1 is a cross-sectional view of a hand-held tool which incorporates a ratchet system made in accordance with the present invention.

With initial reference to FIG. 1, there is shown a ratchet system made in accordance with the present invention and designated generally by the numeral 10, which ratchet system is incorporated in hand-held tool 12. Tool 12 is a portable, battery-powered, light-weight drill having battery power source 14, electric motor 16 controlled by trigger switch 18, and a drill housing designated generally by the numeral 20. Upon activation by trigger switch 18, motor 16 drives drill spindle 22 through planetary reduction gear assembly 24. Gears 26 of the final stage (only one of three gears 26 being shown) are rotatably mounted on gear carrier 28 which is connected to spindle 22. Chuck 30 is also connected to spindle 22 to provide means for holding a workpiece, such as a drill bit, screw driver blade, etc. (not shown) for rotation about spindle axis 32. Although ratchet system 10, to be described in details henceforth, is shown being used with a hand-operated tool, the present invention is not intended to be limited by this application, but only by the appended claims and their equivalents.

Figure 2:
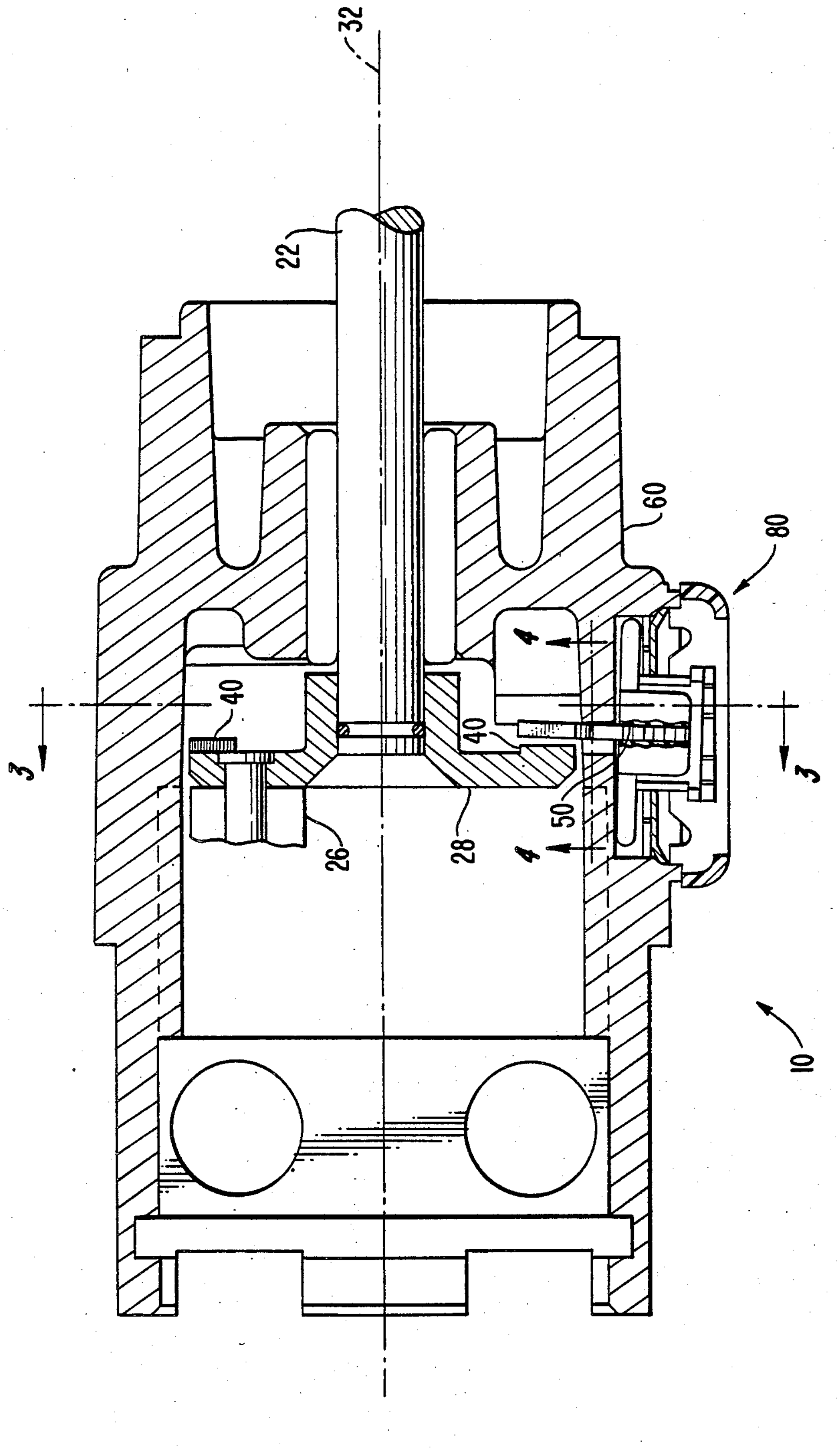
FIG. 2 is a detail enlargement of the ratchet system from FIG. 1.

In accordance with the present invention, the ratchet system, also designated as a ratchet means, permits the housing and the spindle to be selectively interengaged for preventing a substantial degree of relative rotation therebetween in a direction opposite to a given, desired rotational direction while allowing substantially unrestricted relative rotation in the given desired direction. Specifically, the ratchet means includes a carrier member fixedly connected to the spindle for rotation therewith and stop means located on the periphery of the carrier member. As embodied herein, and with reference to FIGS. 2–4, the stop means are nine individual stop members 40 spaced about the periphery of gear carrier 28 on the axial carrier face opposite the face on which gears 26 are mounted. Although it is possible and within the scope of the present invention to use a separate carrier member for stop members 40, mounting the stop members on an already existing part of tool 12, namely gear carrier 28, enables a compact device to be achieved and lowers the cost of the resulting product.

Figure 3:
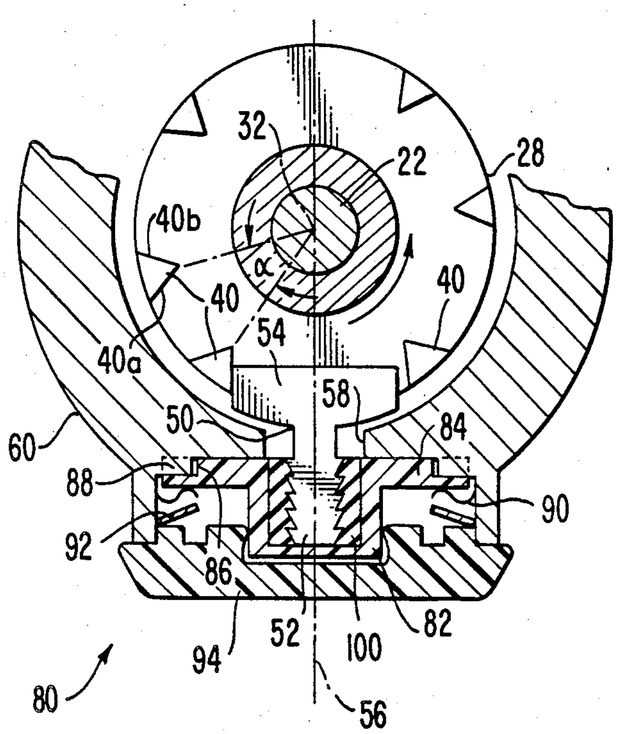
FIG. 3 is a schematic cross-section detail of the ratchet system shown in FIG. 2 taken at the line 3—3.

Preferably, each stop member 40 is wedge shaped, and the stop members 40 are located at 40° intervals around axis 32 (see angle alpha shown on FIG. 3. Opposing wedge sides of each stop member 40, such as sides 40*a*, 40*b*, (see FIG. 3) form the engagement surfaces that, in cooperation with other elements of ratchet means 10, will selectively prevent rotation in the counter clockwise and clockwise directions, respectively. A different number of stop members 40 could be used, as can stop members of a different shape. The 40° angular interval resulting from the use of nine evenly spaced stop members provides an acceptably small degree of rotation until rotation-prohibiting engagement by further elements of ratchet means 10 that will be described henceforth.

Further in accordance with the present invention, the ratchet means includes a stop engaging member having a shaft portion and an arm portion rigidly connected to, and extending at an angle, to the shaft portion. The shaft portion is mounted for rotation in the housing along an axis which is substantially perpendicular to the axis of rotation of the spindle. The arm portion of the stop engaging member is located entirely within the housing, and the shaft portion of the stop engaging member extends through the housing to the outside thereof.

Figure 4:
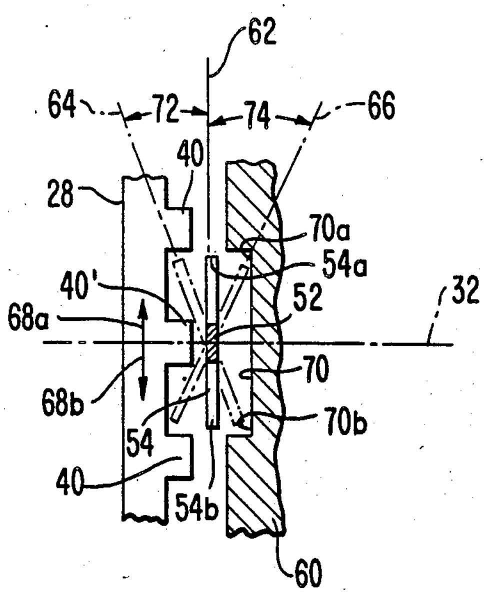
FIG. 4 is another schematic cross-section detail of the ratchet system shown in FIG. 2 but taken at the line 4—4.

As embodied herein, and with particular reference to FIG. 3, "T" shaped stop engaging member 50 includes shaft portion 52 and arm portion 54. Shaft portion 52 is mounted for rotation about axis 56 which is essentially perpendicular to, and intersects, spindle axis 32. As best seen in FIG. 4, stop engaging member 50 normally is oriented with arm portion 54 (i.e., the "cross-bar" of the "T") lying in a plane 62 which is parallel to the plane of rotation of carrier 28, so that no engagement occurs between opposing ends 54*a*, 54*b* of arm portions 54 and stop members 40. However, when shaft 52 (i.e., the "stem" of the "T") is selectively rotated about axis 56, arm portion 54 can be made to lie in either plane 64 or plane 66 so that arm portion ends 54*a* or 54*b*, respectively, can engage stop members 40 to prohibit rotation in the clockwise direction about axis 32 (represented by arrow 64*a*), or the counter-clockwise direction (represented by arrow 68*b*). These alternate engagement positions of arm portion 54 are shown in dotted lines in FIG. 4.

It is a distinct advantage to be able to use a single stop engaging member 50 to prohibit a rotation selectively in either rotational direction about spindle axis 32. Consequently, the particular "T" shape of stop engaging member 50 is highly preferred to other shapes, or to the use of multiple pawls or other types of stop engaging members.

It is further preferred that the ratchet means according to the present invention include stop means associated with the housing and located proximate the stop engaging member for absorbing the engagement force between the stop engaging member and the individual stop member. As embodied herein, and with continued reference to FIG. 4, the housing stop means includes recess 70 formed in the inner wall of housing portion 60 and having corners 70*a*, 70*b* for receiving opposing arm portions 54*a*, 54*b* respectively. Thus, when stop engaging member shaft portion 52 is rotated to place arm portion 54 in the engagement positions corresponding to either planes 64 or 66, the engagement force is transmitted almost entirely through arm portion 54 to housing portion 60, and little or no cantitever force is placed on shaft portion 52. This enables shaft portion 52 to be made relatively light-weight and otherwise simplifies the construction of stop engaging member 50.

It is further preferred that plane 62 of no engagement lie closely parallel to both the plane of rotation of carrier 28 and the plane of recess 70 so that only small angles of rotation 72, 74 (see FIG. 4) about axis 56 are needed to place arm portion 54 in either engagment position. For large angles 72, 74, the resultant force needed to be transmitted through arm portion 54 to provide the same vector resultant force to prevent rotation of carrier 28, will increase dramatically. This can lead to buckling of arm portion 54 unless a stronger, stiffer stop engaging member is employed. In the preferred embodiment pictured in the drawings, angles of rotation 72, 74 are each about 15°.

Preferably, the ratchet means also has hand-actuating means connected to the part of the shaft portion extending outside of the housing. The hand-actuating means includes, in turn, indexing means for preventing rotational movement of the hand-actuating means past a selected one of the non-engagement position and the engagement positions. As embodied herein, and with continued reference to FIG. 3, hand-actuating means designated generally by the numeral 80 includes knob 82 having a flanged base portion 84 positioned adjacent housing portion 60. The indexing means includes recesses 86 formed in the flanged base portion 84 and cooperating protrusions 88 formed in housing portion 60. Annular leaf spring 90 is positioned between spring retainer 92 and knob flange base 84 to bias knob member 82 against housing portion 60. Knob cover 94 is keyed to knob member 82 and simultaneously provides a grasping surface and a protective cover for hand-actuating means 80.

Of course, variations in the hand-actuating means disclosed herein would be immediately apparent to one skilled in the art. For instance, the recesses could be formed in the housing and the protrusions in the knob member. These variations are considered well within the scope of equivalents of the invention sought to be protected herein.

It is also preferred that the ratchet means include ratchet spring means for biasing the stop engaging member to the engagement position after allowing rotational movement of the spindle, the carrier member, and the stop means past the arm portion in the given direction when the shaft portion is in an engagement position. As embodied herein, and with reference to FIG. 3, a rubber bushing 100 is used to connect shaft portion 52 to knob member 82 to allow flexing, relative movement between these parts. Shaft portion 52 is serrated as shown in FIG. 3 to facilitate engagement between shaft portion 52 and bushing 100. Thus, when arm portion 54 is in either of the engagement positions represented by planes 64 and 66, and the knob member 82 is held in the respective indexed position by cooperating recesses 86 and protrusions 88, movement of carrier member 28 and spindle 22 in a given direction is possible while rotation in the opposite direction can be prevented.

For example, and with reference to FIG. 4, if rotation is to be allowed in the clockwise direction 68*a* and prevented in the counter-clockwise direction 68*b*, arm portion 54 would be in plane 64. Movement of carrier 28 in the clockwise direction 68*a* would cause arm portion 54 to be moved out of engagement plane 64 by stop member 40' against the bias provided by bushing 100. Following passage of stop member 40', the bias provided by bushing 100 would return arm portion 54 to engagement plane 64 in position to again prevent rotation in counter-clockwise direction 68*b*. Thus, the disclosed ratchet system for a tool 12 will allow tool 12 to be used as a manually rotated implement in those situations where the required torque is greater than the capacity of motor 16. Such a ratchet system would be especially advantageous for battery-operated tools, such as tool 12, which are necessarily limited in power. The present ratchet system, which is exceedingly simple but highly effective, thus extends the operating range of the particular hand-held tool.

It will be apparent to those skilled in the art that various modifications and variations can be made in the ratchet system of the present invention and in the construction of a hand-held tool incorporating the ratchet system of this invention, without departing from the scope or spirit of the invention. It is intended that the present invention cover the modifications and variations of this invention provided they come within the scope of the appended claims and their equivalents.

What is claimed is:

1. A hand-held tool comprising:

a housing adapted for being hand-held;

a spindle rotatably mounted in said housing;

means for rotating said spindle in a given direction;

ratchet means for selectively interengaging said housing and said spindle for preventing a substantial degree of relative rotation therebetween in a direction opposite to said given rotational direction while allowing substantially unrestricted relative rotation in said given direction, said ratchet means including (i) a carrier member fixedly connected to said spindle for rotation therewith, said carrier member including stop means located on the carrier member periphery, (ii) a stop engaging member having a shaft portion and an arm portion, said arm portion steadfastly fixed to said shaft portion and extending at an angle to said shaft portion, said shaft portion being mounted for rotation in said housing along an axis which is substantially perpendicular to the axis of rotation of said spindle, said arm portion being located within said housing, and said shaft portion extending through said housing to the outside thereof, wherein said shaft portion is selectively rotatable between a non-engagement angular position where said stop means can by-pass said arm portion during rotation of said spindle, and an engagement angular position where said stop means can engage said arm portion and thereby prevent further spindle rotation in said opposite direction.

2. The hand-held tool as in claim 1 wherein said ratchet means further includes hand-actuating means connected to the part of said shaft portion extending outside of said housing, said hand-actuating means including indexing means for preventing rotational movement of said hand-actuating means past a selected one of said non-engagement position and said engagement position.

3. The hand-held tool as in claim 2 wherein said hand-actuating means includes a knob having a flanged base portion extending adjacent to said housing, spring means biasing said knob toward said housing, and wherein said indexing means includes at least one recess formed in said knob base portion and at least one cooperating protrusion formed on said housing, said knob being movable against said spring means away from said housing to disengage said knob recess from said protrusion when said knob is to be indexed.

4. The hand-held tool as in claim 1 wherein said ratchet means also includes ratchet spring means for biasing said stop engaging member to said engagement position after allowing rotational movement of said spindle, said carrier member, and said stop means past said arm portion in said given direction when said arm portion is in said engagement position.

5. The hand-held tool as in claim 4 wherein said ratchet means further includes a knob located outside of, and cooperating with, said housing for manually indexing said stop engaging member between said non-engaging and said engaging positions and wherein said ratchet spring means includes a resilient bushing member connecting said knob to the part of said stop engaging member shaft portion extending through said housing.

6. The hand-held device as in claim 1 wherein said stop engaging member shaft portion also is selectively rotatable to a second engagement position where said stop means can be engaged by said stop engaging member arm portion to prevent further spindle rotation in said given direction while permitting substantially unrestricted spindle rotation in said opposite direction.

7. The hand-held tool as in claim 6 wherein said stop engaging member has a "T" shape with said shaft portion comprising the stem of the "T" and said arm portion comprising the cross-bar of the "T", said cross-bar rotatable about an axis substantially perpendicular to the axis of rotation of said rotatably mounted spindle, the opposing ends of said cross-bar engaging said stop means to selectively prevent spindle rotation in said opposing direction and said given direction when said stem and cross-bar are rotated to said engagement and second engagement angular positions, respectively.

8. The hand-held tool as in claim 7 wherein said engagement position and said second engagement position are angularly disposed on opposite sides of said non-engagement position, and wherein respective angles of rotation of said "T" stem from said non-engagement position to said engaging position and to said second engagement positin are made small in order to provide a resultant engagement force directed substantially along said "T" cross-bar.

9. The hand-held tool as in claim 8 wherein said respective angles of rotation of said stem are each about 15°.

10. The hand-held tool as in claim 6 wherein said carrier member is disc-shaped and said stop means is a plurality of raised, wedge-shaped members wherein opposing wedge sides form respective engagement surfaces for cooperation with said stop engaging member arm portion and said wedge-shaped members are formed on said carrier member at positions within the outer diameter of said disc-shaped carrier member.

11. The hand-held tool as in claim 1 wherein said stop means includes about nine stop members angular spaced about said carrier member periphery to limit the rotation of said spindle to about 40° in said opposite direction following movement of said stop engaging member shaft portion to said engagement position.

12. The hand-held tool as in claim 1 wherein said means for rotating said spindle includes gear means rotating carried on said carrier member.

13. The hand-held tool as in claim 1 wherein said ratchet means further includes a recess formed in an inner surface of said housing proximate said stop engaging member and wherein directly opposing parts of said arm portion simultaneously engage said stop means and said recess, such that a force of engagement between said arm portion and said stop means passes directly to said housing through only said arm portion when said shaft portion is rotated to said engagement position.

14. The hand-held tool as in claim 1 wherein said arm portion is integral with said shaft portion of said stop engaging member.

15. A ratchet system for a hand-held tool having a housing and spindle mounted to rotate within the housing about an axis, the ratchet system comprising:

(a) a disc-shaped carrier member fixed to said spindle for rotation therewith and having the stop means positioned on the carrier periphery, and (b) a "T" shaped stop engaging member mounted in said housing in a plane substantially perpendicular to said spindle axis and spaced from said carrier member along said spindle axis, said stop engaging member being selectively rotatable about the stem of the "T" member to cause the cross-bar portion of the "T" member to rotate about the axis of rotation of said stem portion such that the cross-bar portion rotates out of said plane and into engagement with said carrier stop means whenever rotation of said spindle is to be limited.

16. The hand-held tool as in claim 15 wherein said "T" member stem portion is rotatably mounted in said housing and is actuated by hand-actuating means located outside said housing, and wherein said hand-actuating means includes indexing means keyed to said housing, and a ratchet spring member connecting said indexing means to said shaft portion.

17. The hand-held tool as in claim 15 further including further stop means associated with said housing wherein, following rotation of said "T" member stem portion, said "T" member cross-bar portion transmits substantially all of the force of engagement from said carrier stop means to said housing stop means.

18. The hand-held tool as in claim 15 wherein said "T" member can be rotated in either angular direction about said stem portion to engage said carrier stop means and to selectively prevent further rotation of said spindle in one or the other respective angular directions about said spindle axis, and wherein the respective angles of rotation of said "T" member stem portion are each about 15°.

19. The hand-held tool as in claim 16 wherein said stop means includes a plurality of stop members spaced about the periphery of said carrier member to limit spindle rotation to a small angle following rotation of said "T" cross-bar portion out of said plane and into position for engagement with said stop members.

20. A hand-held tool comprising:

a housing adapted for being hand-held;

a spindle rotatably mounted in said housing;

means for rotating said spindle in a given direction;

ratchet means for selectively interengaging said housing and said spindle for preventing a substantial degree of relative rotation therebetween in a direction opposite to said given rotational direction while allowing substantially unrestricted relative rotation is said given direction, said ratchet means including (i) a carrier member fixedly connected to said spindle for rotation therewith, said carrier member including stop means located on the carrier member periphery, (ii) a stop engaging member having a shaft portion and an arm portion, said arm portion steadfastly fixed to said shaft portion and extending at an angle to said shaft portion, said shaft portion and said arm portion being mounted for rotation in said housing about an axis which is substantially perpendicular to the axis of rotation of said spindle, and said shaft portion extending through said housing to the outside thereof, wherein said shaft portion is selectively rotatable between a non-engagement angular position wherein said stop means can by-pass said arm portion during rotation of said spindle, and an engagement angular position where said stop means can engage said arm portion and thereby prevent further spindle rotation in said opposite direction.

21. The hand-held tool as in claim 20 wherein said carrier member is substantially disc-shaped and the stop means on said carrier member are located within the outer diameter of said disc-shaped carrier member.

22. The hand-held tool as in claim 21 wherein the arm portion of said stop engaging member is axially spaced from and located substantially within the outer diameter of said disc-shaped carrier.

23. The hand-held tool as in claim 22 wherein ratchet means further includes a recess formed in an inner surface of said housing proximate said stop member and axially spaced from and overlapping the carrier diameter, wherein directly opposing parts of said arm portion simultaneously engage said stop means and said recess, such that a force of engagement between said arm portion and said stop means passes directly to said housing through only said arm portion when said shaft portion is rotated to said engagement position.

* * * * *